(12) United States Patent
Sharma et al.

(10) Patent No.: US 9,416,721 B2
(45) Date of Patent: Aug. 16, 2016

(54) CHARGE AIR COOLER WATER PROTECTION

(71) Applicant: DENSO International America, Inc., Southfield, MI (US)

(72) Inventors: Rajeev Sharma, Troy, MI (US); Robert Brinker, Ortonville, MI (US); Koichi Yamamoto, Novi, MI (US)

( * ) Notice: Subject to any disclaimer, the term of this patent is extended or adjusted under 35 U.S.C. 154(b) by 102 days.

(21) Appl. No.: 14/312,106

(22) Filed: Jun. 23, 2014

(65) Prior Publication Data
US 2015/0369119 A1 Dec. 24, 2015

(51) Int. Cl.
*F02B 33/44* (2006.01)
*F02B 29/04* (2006.01)

(52) U.S. Cl.
CPC .................................. *F02B 29/0468* (2013.01)

(58) Field of Classification Search
CPC .................................................... F02B 29/0475
USPC ............................................ 60/599; 123/563
See application file for complete search history.

(56) References Cited

U.S. PATENT DOCUMENTS

| | | | | |
|---|---|---|---|---|
| 4,679,410 A | * | 7/1987 | Drayer ............... | B60H 1/00335 165/153 |
| 5,526,876 A | * | 6/1996 | Karube ............... | F28D 1/05391 165/174 |
| 6,557,371 B1 | * | 5/2003 | Judge .................... | F25B 31/004 165/110 |
| 6,748,741 B2 | | 6/2004 | Martin et al. | |
| 7,257,937 B2 | | 8/2007 | Nakagiri et al. | |
| 8,191,366 B2 | | 6/2012 | Taylor | |
| 2009/0223493 A1 | | 9/2009 | Rutherford | |
| 2010/0300647 A1 | | 12/2010 | Steurer et al. | |
| 2011/0094219 A1 | | 4/2011 | Palm | |
| 2013/0019845 A1 | | 1/2013 | Meyer | |
| 2013/0098341 A1 | | 4/2013 | Yoon et al. | |

FOREIGN PATENT DOCUMENTS

EP 2474805 A1 7/2012

* cited by examiner

*Primary Examiner* — Jason Shanske

(57) ABSTRACT

A structure for separating condensate formed in a charge-air-cooler of a turbocharged engine system. The structure may include ribs that catch and direct condensate away from the outlet. The structure may also include a deflector and water dam that prevents condensation from exiting the charge-air-cooler outlet. The condensate maybe be collected and simply drained to outside of the vehicle.

19 Claims, 6 Drawing Sheets

CHARGE AIR COOLER WATER PROTECTION

FIELD

This present disclosure relates to the field of automotive heat exchangers, more specifically this disclosure relates to a charge-air-cooler with a condensate removal structure.

BACKGROUND

This section provides background information related to the present disclosure which is not necessarily prior art.

The present disclosure relates generally to turbocharger systems used with internal combustion engines in vehicles, and more particularly to charge-air-cooler assemblies used with turbocharger systems in vehicles.

Turbocharged and supercharged engines generally are configured to compress ambient air entering the engine in order to increase power. Because compression of the air may cause an increase in air temperature, a charge-air-cooler is commonly utilized to cool the heated air; the cooling increases the air density which further increases the potential power of the engine. If the humidity of the ambient air is high, however, condensation may form on internal surfaces of the charge-air-cooler that is cooler than the dew point of the compressed air. During transient conditions such as hard vehicle acceleration, these water droplets may be blown out of the charge-air-cooler and into the combustion chambers of the engine resulting in increased potential for engine misfire, loss of torque and engine speed, and incomplete combustion, for example. If the condensation ingestion into the engine intake is severe enough, the vehicle's engine control module may light the "service engine soon" light, which is very undesirable.

It would be desirable to have a heat exchanger which has an integrated structure to capture the condensation, and the present development seeks to provide such a heat exchanger.

SUMMARY

This section provides a general summary of the disclosure, and is not a comprehensive disclosure of its full scope or all of its features.

A charge-air-cooler for a vehicle engine system that may contain an inlet tank a core portion fluidly joining the inlet tank with an outlet tank, the inlet and outlet tank may have an inlet opening and outlet opening respectively. The outlet tank may have a plurality of guide ribs on an inside surface of the outlet tank. The outlet also may have a deflector and a water dam, the water dam may be offset further downstream of the deflector.

An additional embodiment may be a charge air condensation removal structure for a vehicle with an inlet end tank that may have an inlet to allow charge air to enter, an outlet end tank with an outlet to allow the cooled charge air to exit. Also, a plurality of tubes may fluidly couple the inlet end tank and the outlet end tank, wherein the outlet end tank having a plurality of horizontal guide ribs and vertical guide ribs on an inside surface of the outlet tank. The outlet may have a deflector and a water dam in the outlet that may prevent some condensate from proceeding out of the outlet.

An additional embodiment may be a charge air condensation separation system for a turbocharged engine. The system may have a turbocharger with a compressor providing charge air to a charge air cooler connected to the compressor. The system may also have a charge air delivery duct connected to an outlet of the charge air cooler, within the outlet a deflector and a water dam disposed in the outlet, the water dam may be offset further downstream of the deflector. Also the system may have a plurality of guide ribs disposed in the charge air cooler to direct water away from the outlet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
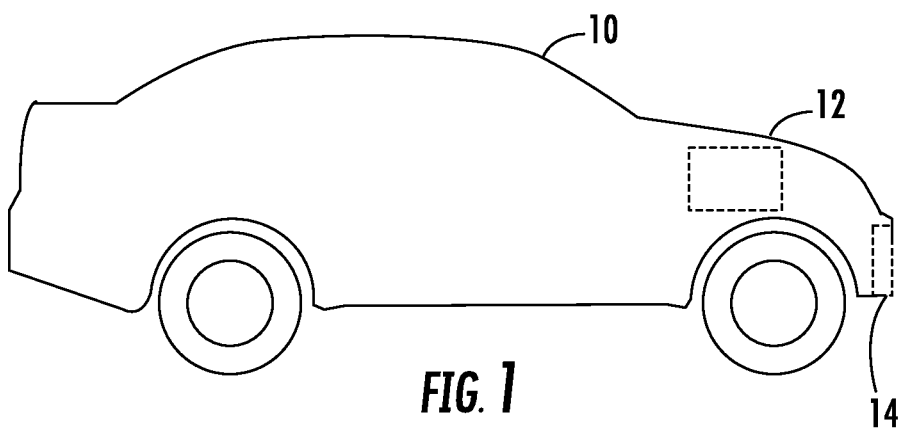
FIG. 1 is a schematic representation of a vehicle having a turbocharged engine system.

Example embodiments will now be described more fully with reference to the accompanying drawings. The following description is merely exemplary in nature and is not intended to limit the present disclosure, application, or uses. It should be understood that throughout the drawings, corresponding reference numerals indicate like or corresponding parts and features.

Figure 2:
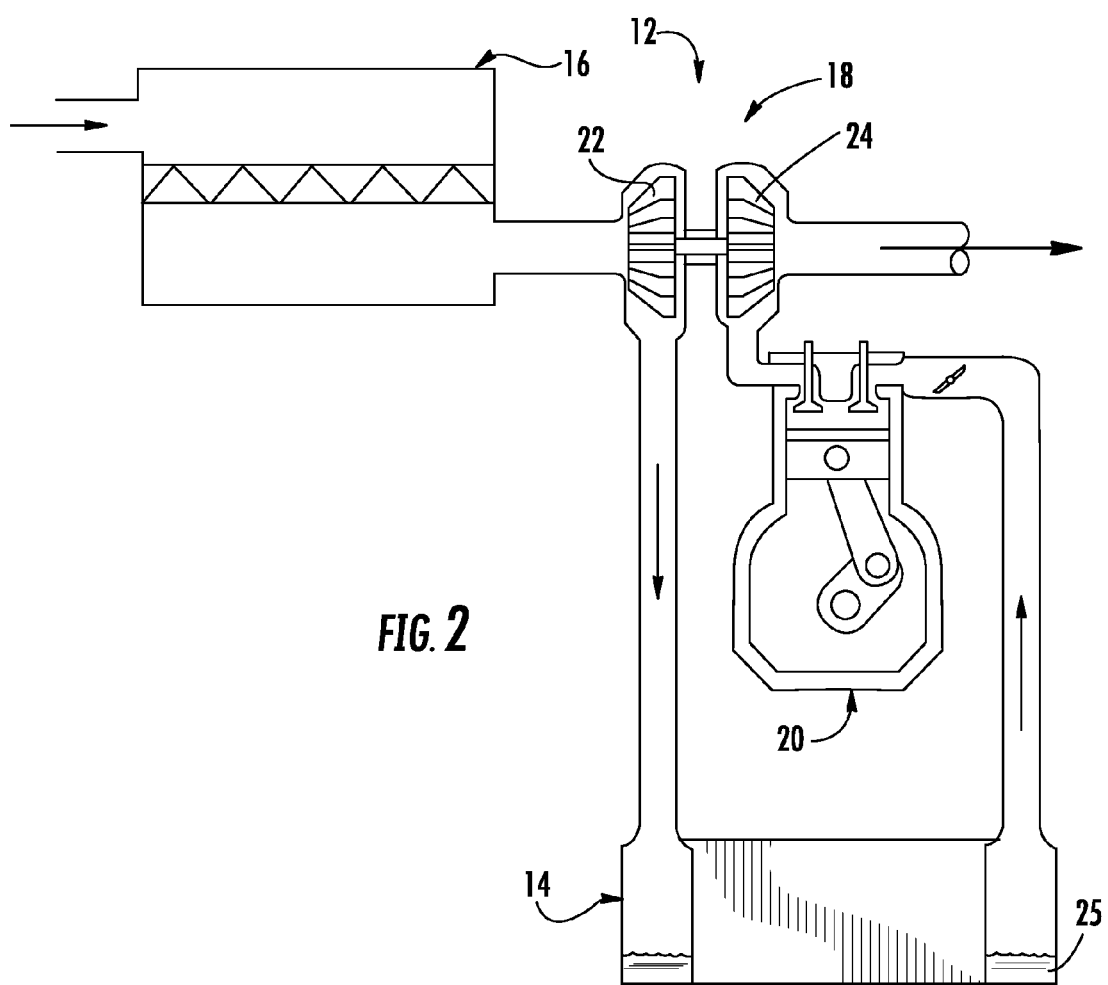
FIG. 2 is a representation of turbocharged engine system.

FIG. 1 depicts a vehicle 10 with a turbocharged engine system 12, within that system consists a charge-air-cooler (CAC) 14 or also known in the art as an intercooler. Referring now to FIG. 2, a turbocharged engine system 12 is depicted according to the prior art. The turbocharged engine system 12 includes an air intake filter housing 16, a turbocharger 18, a charge air cooler 14, and an engine 20. The turbocharger 18 includes a compressor 22 for supplying combustion air to an air intake of the engine 20 and a turbine 24 connected to the compressor 22 with a shaft. The turbine 24 receives exhaust gases from the engine 20 and drives the compressor 22, which compresses the intake air. The charge air cooler 14 receives the compressed air from the compressor 22 of the turbocharger 18 and cools the air as it passes there through. Condensate 25 may collect in the charge air cooler 14 and may be drawn into the engine 20, which is undesirable, because condensate from the charge air cooler 14 may foul combustion of the engine 20.

Figure 3:
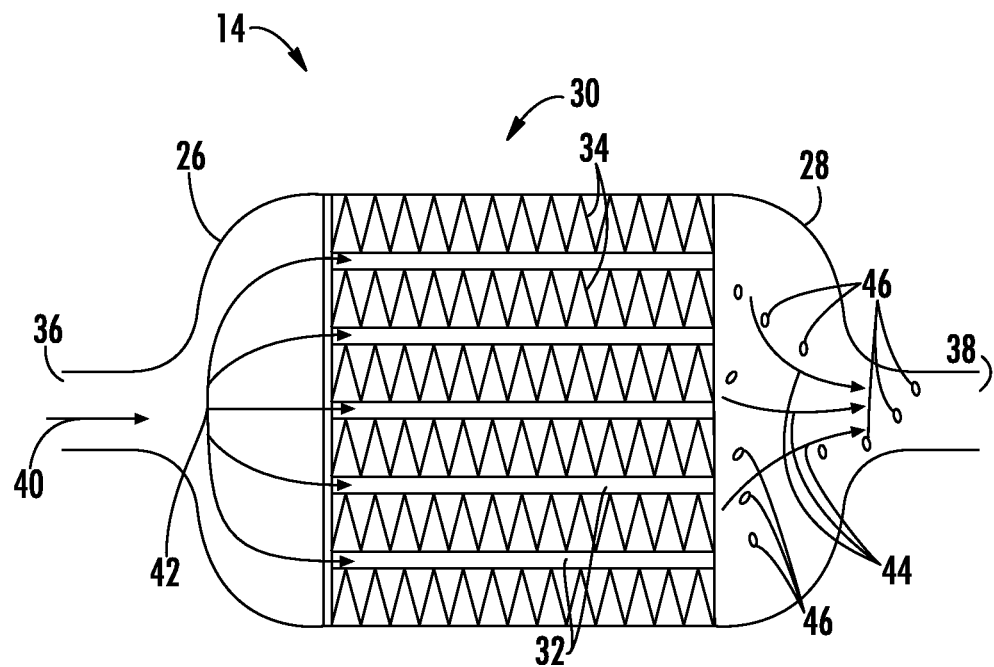
FIG. 3 is a representation of a charge-air-cooler.

With reference to FIG. 3, an isolated view of a CAC 14 that may be used on a typical vehicle 10 is shown. The CAC 14 has an inlet end tank 26 and outlet end tank 28, also known in the art as end tanks or inlet tank and outlet tank respectively. A core section 30 connects the inlet end tank 26 to the outlet end tank 28. The core section includes plurality of tubes 32, in between the tubes is a series of fins 34. The inlet end tank 26 contains an inlet 36, the outlet end tank 28 has an outlet 38. The typical function of the CAC 14 is the warm compressed charge air will flow into inlet 36 represented by arrow 40. The charge air would fill the inlet end tank 26 and flow through the plurality of tubes 32 represented by arrows 42. The cooled charge air exits the tubes 32 in the outlet tank 28, and out the outlet 38, the flow represented by arrows 44. As previously stated, condensation may be formed on any internal surface of the charge-air-cooler that is cooler than the dew point of the compressed air. That condensation 46 may travel into the engine 12 with the airflow 44 and may cause damage.

Figure 4:
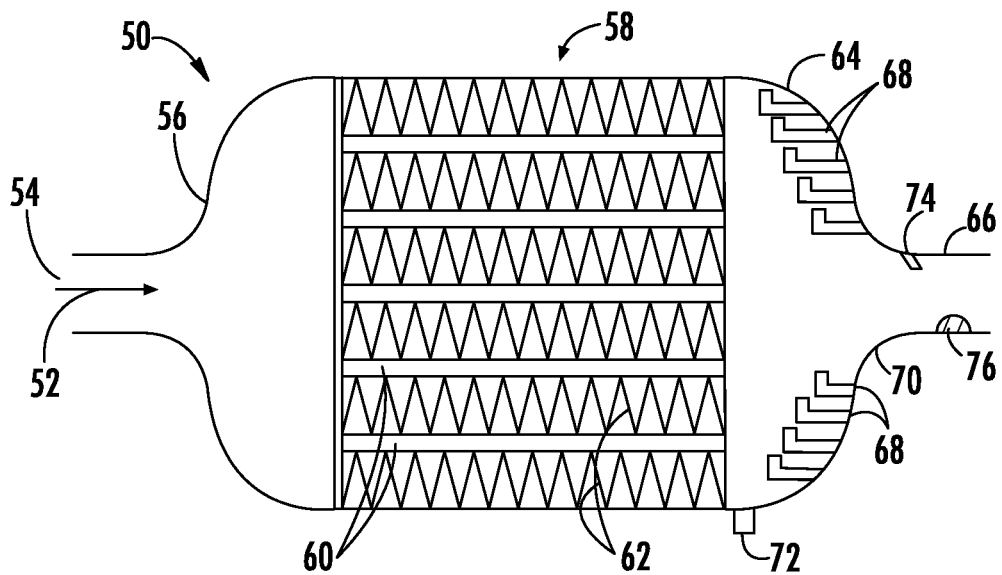
FIG. 4 is an overall view of a charge-air-cooler.

The current embodiment is depicted in FIG. 4, which is a cross section view of a CAC 50. The CAC 50 may generally operate the same as a standard CAC 14. The charged air represented by arrow 52 enters the inlet 54 of the inlet end tank 56. The charged air passes through the core section 58, the core section 58 may contain a series of tubes 60 for the charged air to pass through, in between the tubes 60 may be a plurality of fins 62. The cooled charged air exits the tubes 60 into the outlet end tank 64 and out the outlet 66. As previously stated condensate may form on the internal components of the CAC 50. The outlet end tank 64 may contain guide ribs 68 on the internal wall 70 of the outlet end tank 64. The guide ribs 68 may catch condensate droplets (not shown) traveling within the charged air flow, the guide ribs 68 may be channels to transfer the collected condensate to the bottom of the outlet end tank 64 where there may be a drain 72 to evacuate any collected condensate outside the system. The CAC 50 may also include a deflector 74 and water dam 76 located within the outlet 66 of the outlet end tank 64, wherein the deflector 74 and water dam 76 may be on opposing sides of the outlet 66. It is understood in the art that the specific position of the outlet 66 can be anywhere on the outlet end tank 64, in any configuration or orientation. The guide ribs 68, deflector 74, and water dam 76 may be utilized in any such configuration.

Figure 5:
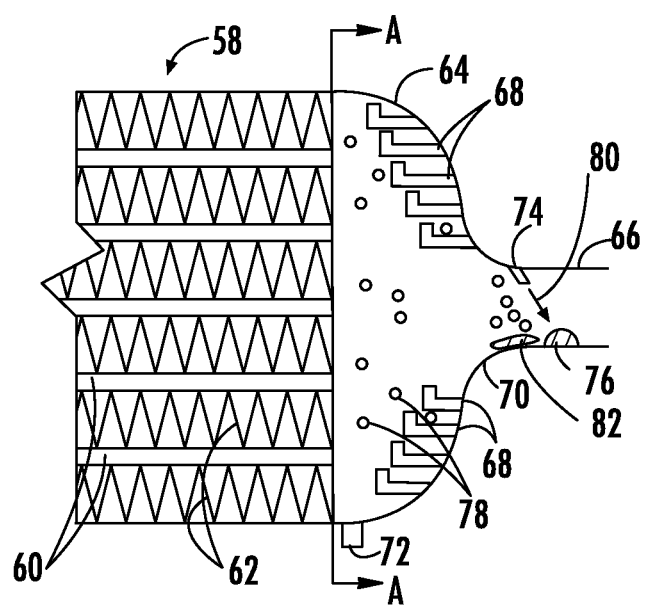
FIG. 5 is a view of the outlet tank.

FIG. 5 depicts a larger view of the outlet end tank 64, as previously discussed condensate 78 can form within the CAC 50, as the condensate 78 travels through the outlet end tank 64 the mass of the condensate droplets may carry them to the interior wall 70 of the outlet end tank 64. The guide ribs 68 may trap the condensate 78 and prevent the condensate from exiting out the outlet 66. However, condensate 78 may be able to exit the tubes 60 and directly exit the CAC 50 through the outlet 66 without approaching the guide ribs 68. To prevent that condensate 78 from flowing directly out of the outlet 66 the interior of the outlet 66 may contain a deflector 74. As the air flow and condensate 78 travels within the outlet some of the airflow, depicted by arrow 80, and condensate 78 will be deflected downward by deflector 74. The deflected airflow 80 and condensate 78 may collect additional condensate 78 not directly deflected by the deflector 74 and force it to the bottom of the outlet 66. At the bottom of the outlet 66 offset downstream of the deflector may be a water dam 76. The water dam may prevent the collected condensate 82 from exiting out the outlet 66 and into the engine 20. The collected condensate 82 may then flow down from the outlet 66 to the lower guide ribs 68 and may be directed to the drain 72.

Figure 6:
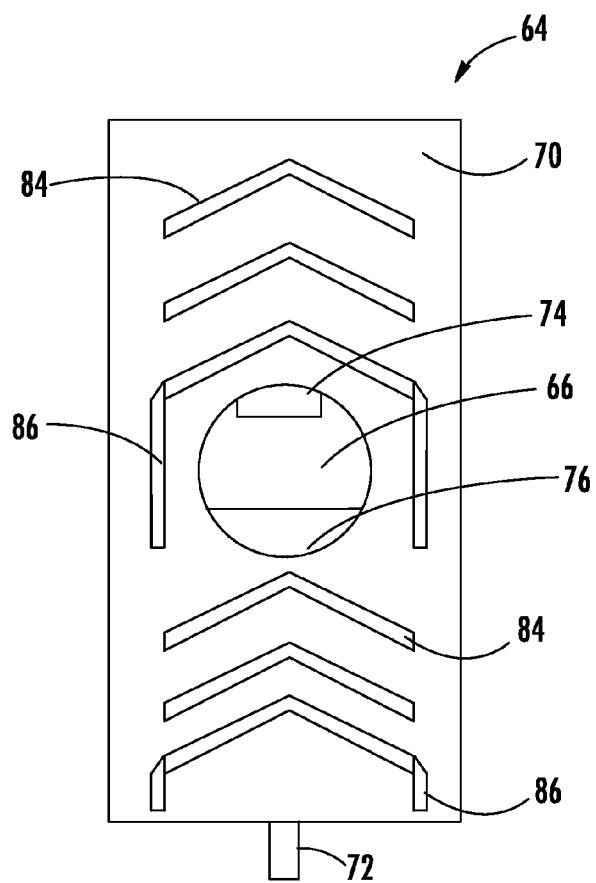
FIG. 6 is a view of the interior of the outlet tank.

FIG. 6 depicts an interior view of the outlet end tank 64 from section A from FIG. 5. The guide ribs 68 may be arranged with generally lateral channels 84 and vertical channels 86 along the sides of the outlet end tank interior wall 70. The lateral channels 84 may angle downward from the center of the outlet end tank 64 and direct the condensate to the vertical side channels 86, that are parallel to the sides of the outlet end tank 64, to be directed to the bottom of the outlet end tank 64 and to drain 72.

Figure 7:
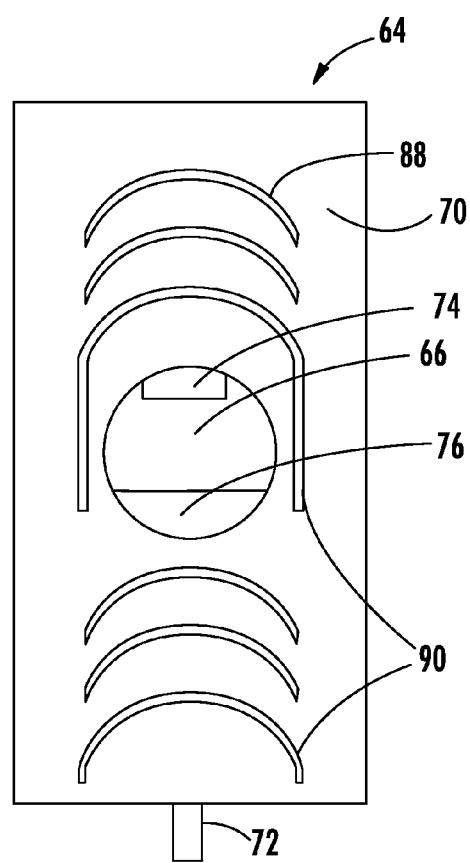
FIG. 7 is another view of the interior of the outlet tank.

FIG. 7 depicts yet another embodiment of the interior of the outlet end tank 64. The guide ribs 88 are generally curved downward from the center of the outlet end tank 64 to direct condensate away from the outlet 66. This embodiment may contain vertical channels 90, which may be substantially parallel to the sides of the outlet end tank 64, to direct condensate along the sides of the outlet end tank 64 interior wall 70 to the drain 72.

Figure 8:
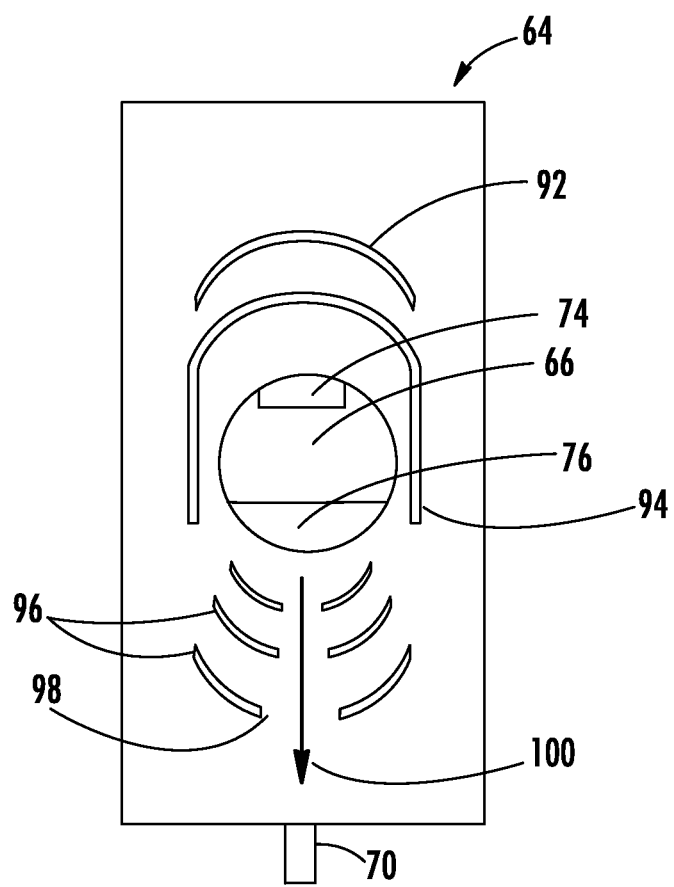
FIG. 8 is another view of the interior of the outlet tank.

FIG. 8 depicts yet another embodiment of the interior of the outlet end tank 64. The water guide ribs 92 above the outlet 66 are generally curved downward from the center of the outlet end tank 64 to direct condensate to the vertical channels 94. This embodiment may also contain water guide ribs 96 below the outlet 66 that are curved upward from center. A central channel 98 may be formed by the water guide ribs 96 not spanning entirely across the interior wall 70 of the outlet end tank 64. This channel 98 may allow the condensate collected by the water dam 76, represented by arrow 100, to directly drain to the bottom of the outlet end tank 64 and to the drain 72. It can be understood that the center channel 98 may be incorporated in any embodiment regardless of the shape of water guide ribs. It can also be understood in the art that the drain 72 structure may be any suitable structure to evacuate the trapped condensate out of the CAC 50.

Those in the art can appreciate that the water guide ribs 68, the air deflector 74, and water dam 76 may be formed with the same material as the outlet tank 64; the material may be aluminum, any type of molded plastic or polymer, or stamped metal by way of non-limiting example. The water guide ribs 68, the air deflector 74, and water dam 76 may be molded as one with the outlet end tank 64, or the water guide ribs 68, the air deflector 74, and water dam 76 may be separately attached to the interior of the outlet end tank 64 by way of non-limiting example. It can also be appreciated that the air deflector 74 and water dam 76 may be stamped into the outlet 66 of the CAC 50.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A charge-air-cooler for a vehicle comprising:
   an inlet tank;
   an outlet tank; and
   a core portion fluidly joining the inlet tank and the outlet tank,
   wherein the inlet tank has an inlet to allow charge air to enter and the outlet tank has an outlet to allow the charge air to exit; the outlet tank having a plurality of guide ribs on an inside surface of the outlet tank, the outlet having a deflector and a water dam wherein the water dam is offset further downstream of the deflector in a direction of the charge air.

2. The charge-air-cooler for a vehicle according to claim 1, wherein the guide ribs further comprise a plurality of lateral channels and vertical channels to guide condensation away from the outlet.

3. The charge-air-cooler for a vehicle according to claim 2, wherein the lateral channels angle downward from a location perpendicular to a horizontal center of the outlet tank to the vertical channels at a side of the outlet tank.

4. The charge-air-cooler for a vehicle according to claim 2, wherein the lateral channels are curved downward from a location perpendicular to a horizontal center of the outlet tank to the vertical channels at a side of the outlet tank.

5. The charge-air-cooler for a vehicle according to claim 2, wherein a vertical channel spans downward from the outlet to a bottom of the outlet tank.

6. The charge-air-cooler for a vehicle according to claim 1, wherein the core portion further comprises a plurality of tubes that fluidly join the inlet tank and outlet tank, and a series of fins disposed between the tubes.

7. The charge-air-cooler for a vehicle according to claim 1, wherein a condensate drain is fluidly coupled to the outlet tank.

8. The charge-air-cooler for a vehicle according to claim 1, wherein a first set of guide ribs located above the outlet are lateral channels that are curved downward from a location perpendicular to a horizontal center of the outlet tank; and a second set of guide ribs below the outlet are lateral channels that are curved upward from a location perpendicular to a horizontal center of the outlet tank.

9. A charge air condensation removal structure for a vehicle comprising:
an inlet end tank with an inlet to allow charge air to enter;
an outlet end tank with an outlet to allow the charge air to exit; and
a plurality of tubes fluidly coupling the inlet end tank and the outlet end tank,
wherein the outlet end tank having a plurality of horizontal guide ribs and vertical guide ribs on an inside surface of the outlet tank, the outlet having a deflector and a water dam wherein the water dam is offset further downstream of the deflector in the outlet in a direction of the charge air.

10. The charge air condensation removal structure for a vehicle according to claim 9, wherein the vertical guide ribs further comprise a vertical channel spanning from the outlet downward to a bottom of the outlet end tank.

11. The charge air condensation removal structure for a vehicle according to claim 9, wherein the vertical guide ribs further comprise a vertical channel spanning downward parallel to sides of the outlet end tank.

12. The charge air condensation removal structure for a vehicle according to claim 9, wherein the horizontal guide ribs angle downward from a location perpendicular to a horizontal center of the outlet tank to the vertical guide ribs at a side of the outlet tank.

13. The charge air condensation removal structure for a vehicle according to claim 9, wherein the horizontal guide ribs are curved downward from a location perpendicular to a horizontal center of the outlet tank to the vertical guide ribs at a side of the outlet tank.

14. The charge air condensation removal structure for a vehicle according to claim 9, wherein a condensate drain is fluidly joined to the outlet tank.

15. A charge air condensation separation system for a turbocharged engine comprising:
a turbocharger having a compressor providing charge air;
a charge air cooler connected to the compressor and receiving the charge air;
a charge air delivery duct connected to an outlet of the charge air cooler;
a deflector and a water dam disposed in the outlet, the water dam offset further downstream of the deflector toward the charge air delivery duct; and
a plurality of guide ribs disposed in the charge air cooler to direct water away from the outlet.

16. The charge air condensation separation system for a turbocharged engine according to claim 15, wherein the charge air cooler further comprises;
an inlet tank;
an outlet tank; and
a core portion fluidly joining the inlet tank and the outlet tank, wherein the outlet is connected to the outlet tank of the charge air cooler.

17. The charge air condensation separation system for a turbocharged engine according to claim 15, wherein the plurality of guide ribs are connected to the outlet tank.

18. The charge air condensation separation system for a turbocharged engine according to claim 15, further comprising;
a drain fluidly coupled to the charge air cooler.

19. The charge air condensation separation system for a turbocharged engine according to claim 15, further comprising; wherein the water dam is on an opposing side of the outlet than the deflector.

* * * * *